US008331636B2

(12) United States Patent
Shinagawa et al.

(10) Patent No.: US 8,331,636 B2
(45) Date of Patent: Dec. 11, 2012

(54) AUTOMATIC CALIBRATION OF COMPUTER AIDED DIAGNOSIS BASED ON RETROSPECTIVE EXAMINATION

(75) Inventors: Yoshihisa Shinagawa, Downingtown, PA (US); Gerardo Hermosillo Valadez, West Chester, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 936 days.

(21) Appl. No.: 12/204,870

(22) Filed: Sep. 5, 2008

(65) Prior Publication Data

US 2009/0067693 A1     Mar. 12, 2009

Related U.S. Application Data

(60) Provisional application No. 60/971,361, filed on Sep. 11, 2007.

(51) Int. Cl.
*G06K 9/00* (2006.01)
(52) U.S. Cl. ...................................... 382/128
(58) Field of Classification Search .................. None
See application file for complete search history.

(56) References Cited

U.S. PATENT DOCUMENTS

| 6,198,838 | B1 * | 3/2001 | Roehrig et al. ............... 382/132 |
| 8,184,882 | B2 * | 5/2012 | Yu et al. ......................... 382/128 |
| 2008/0125643 | A1 * | 5/2008 | Huisman et al. ............. 600/420 |

OTHER PUBLICATIONS

BI-RADS—Mammography "Assessment Categories", American College of Radiology, 2003.*
BI-RADS—Mammography "Follow-Up and Outcome Monitoring", American College of Radiology, 2003.*

* cited by examiner

*Primary Examiner* — Clayton E Laballe
*Assistant Examiner* — Dennis Hancock
(74) *Attorney, Agent, or Firm* — Peter Withstandley (57) ABSTRACT

A method for automatic detection of lesions within a medical image include acquiring medical image data. Regions of suspicion are automatically identified within the medical image data. It is automatically determined whether each identified region of suspicion is of a benign state, is of a suspicious state that requires a biopsy, or is of an indeterminate state that requires subsequent imaging after a particular length of time. When an identified region of suspicion is determined to be of an indeterminate state, the determination is automatically reconsidered in light of a calibration factor that biases the automatic determination towards either a benign state or a suspicious state. The calibration factor may be based on data collected from follow-up examinations that reveal whether a lesion previously characterized as indeterminate was actually a benign or malignant lesion or on additional diagnostic information including prior image data or non-image data.

18 Claims, 5 Drawing Sheets

Category 1

Category 2

Category 3

AUTOMATIC CALIBRATION OF COMPUTER AIDED DIAGNOSIS BASED ON RETROSPECTIVE EXAMINATION

CROSS-REFERENCE TO RELATED APPLICATION

The present application is based on provisional application Ser. No. 60/971,361 filed Sep. 11, 2007, the entire contents of which are herein incorporated by reference.

BACKGROUND OF THE INVENTION

1. Technical Field

The present disclosure relates to computer aided diagnosis and, more specifically, to automatic calibration of computer aided diagnosis based on retrospective examination.

2. Discussion of Related Art

Computer aided diagnosis (CAD) is the process of using computer vision systems to analyze medical image data and make a determination as to what regions of the image data are potentially problematic. Some CAD techniques then present these regions of suspicion to a medical professional such as a radiologist for manual review, while other CAD techniques make a preliminary determination as to the nature of the region of suspicion. For example, some CAD techniques may characterize each region of suspicion as a lesion or a non-lesion. The final results of the CAD system may then be used by the medical professional to aid in rendering a final diagnosis.

Because CAD techniques may identify lesions that may have been overlooked by a medical professional working without the aid of a CAD system, and because CAD systems can quickly direct the focus of a medical professional to the regions most likely to be of diagnostic interest, CAD systems may be highly effective in increasing the accuracy of a diagnosis and decreasing the time needed to render diagnosis. Accordingly, scarce medical resources may be used to benefit a greater number of patients with high efficiency and accuracy.

CAD techniques have been applied to the field of mammography, where low-dose x-rays are used to image a patient's breast to diagnose suspicious breast lesions. However, because mammography relies on x-ray imaging, mammography may expose a patient to potentially harmful ionizing radiation. As many patients are instructed to undergo mammography on a regular basis, the administered ionizing radiation may, over time, pose a risk to the patient. Moreover, it may be difficult to use x-rays to differentiate between different forms of masses that may be present in the patient's breast. For example, it may be difficult to distinguish between calcifications and malignant lesions.

Magnetic resonance imaging (MRI) is a medical imaging technique that uses a powerful magnetic field to image the internal structure and certain functionality of the human body. MRI is particularly suited for imaging soft tissue structures and is thus highly useful in the field of oncology for the detection of lesions.

In dynamic contrast enhanced MRI (DCE-MRI), many additional details pertaining to bodily soft tissue may be observed. These details may be used to further aid in diagnosis and treatment of detected lesions.

DCE-MRI may be performed by acquiring a sequence of MR images that span a time before magnetic contrast agents are introduced into the patient's body and a time after the magnetic contrast agents are introduced. For example, a first MR image may be acquired prior to the introduction of the magnetic contrast agents, and subsequent MR images may be taken at a rate of one image per minute for a desired length of time. By imaging the body in this way, a set of images may be acquired that illustrate how the magnetic contrast agent is absorbed and washed out from various portions of the patient's body. This absorption and washout information may be used to characterize various internal structures within the body and may provide additional diagnostic information.

Regardless of whether CAD is performed based on mammography or DCE-MRI, one or more regions of suspicion may be identified by the CAD system. Conventionally, a trained medical professional such as a radiologist may manually identify and classify the regions of suspicion within the medical image data. The radiologist may then manually characterize each region of suspicion in accordance with some quantitative guidelines. For example, regions of suspicion identified within the breast may be characterized according to Breast Imaging Reporting and Data Systems (BIRADS) guidelines.

The classification assigned to each region of suspicion may dictate the future course of action. For example, if the region of suspicion is classified as likely malignant, a biopsy may be ordered. If the region of suspicion is classified as normal, no further action may be taken. If, however, the region of suspicion is classified as a potential risk, the course of action may be to repeat the test in six months.

CAD systems have been developed to automatically classify a region of suspicion. These automatic systems may occasionally lead to a biopsy of a region of suspicion that turns out to be benign or may occasionally lead to a subsequent six-month evaluation that leads to a biopsy that establishes malignancy. Such findings may be suboptimal, as there is no need to biopsy a benign lesion and it is preferable not to wait six months before biopsying a malignant lesion.

The CAD system is generally programmed to minimize these sorts of over inclusion and under inclusion errors. Programming of the CAD system may utilize computer-learning approaches where training data is provided to help the CAD system learn the difference between a benign and a malignant lesion. However, once the CAD system has been fully programmed, additional program refinement is generally not performed. Accordingly, there is presently no way to refine CAD systems for the particular needs of the institution or physician that uses the CAD system.

Additionally, conventional CAD systems generally base their determination entirely on the image data collected. It must then be left to the medical professional to analyze this information in light of other pertinent information such as patient medical history.

SUMMARY

A method for automatic detection of lesions within a medical image includes acquiring medical image data. One or more regions of suspicion are automatically identified within the medical image data. It is automatically determined whether each identified region of suspicion is of a benign state that requires no course of action, is of a suspicious state that requires a biopsy, or is of an indeterminate state that requires subsequent imaging after a particular length of time. A determination that a region of suspicion is of an indeterminate state is made upon consideration of a calibration factor that biases the automatic determination towards either a benign state or a suspicious state.

The calibration factor may be based upon data collected from follow-up automatic detection examinations that reveal whether a lesion previously characterized as indeterminate was actually a benign or malignant lesion. Alternatively, the calibration factor may be based upon additional diagnostic information.

The additional diagnostic information may include prior image data. The additional diagnostic information may include non-image data.

In automatically determining the state of each identified region of suspicion, each region of suspicion may be characterized in accordance with BIRADS and the benign state may be BIRADS 1 or 2, the indeterminate state may be BIRADS 3, and the suspicious state may be BIRADS 4 or above.

The higher the calibration factor, the greater the bias may be for a region of suspicion to be characterized as a suspicious state and the lower the calibration factor, the greater the bias may be for a region of suspicion to be characterized as a benign state.

A determination that a region of suspicion is of an indeterminate state may be made after a preliminary finding that the region of suspicion is of an indeterminate state for which the calibration factor is not considered followed by a reconsideration for which the calibration factor is considered.

The medical image data may be dynamic contrast enhanced MR image data including a patient's breast.

The automatic identification of the regions of suspicion may include identifying the regions of suspicion based on an absorption and washout profile observed from the dynamic contrast enhanced MRI. The medical image data may be mammography image data.

A method for automatic detection of lesions within a medical image include acquiring medical image data. One or more regions of suspicion are automatically identified within the medical image data. It is automatically determined whether each identified region of suspicion is of a benign state that requires no course of action, is of a suspicious state that requires a biopsy, or is of an indeterminate state that requires subsequent imaging after a particular length of time. When an identified region of suspicion is determined to be of an indeterminate state, the determination is automatically reconsidered in light of a calibration factor that biases the automatic determination towards either a benign state or a suspicious state.

The calibration factor may be based upon data collected from follow-up automatic detection examinations that reveal whether a lesion previously characterized as indeterminate was actually a benign or malignant lesion. Alternatively, the calibration factor may be based upon additional diagnostic information.

The additional diagnostic information may include prior image data. The additional diagnostic information may include non-image data.

In automatically determining the state of each identified region of suspicion, each region of suspicion may be characterized in accordance with BIRADS and the benign state is BIRADS 1 or 2, the indeterminate state is BIRADS 3, and the suspicious state is BIRADS 4 or above.

A computer system includes a processor and a program storage device readable by the computer system, embodying a program of instructions executable by the processor to perform method steps for automatically detecting breast lesions. The method includes acquiring medical image data including a patient's breast. One or more regions of suspicion are automatically identified within the medical image data. It is automatically determined whether each identified region of suspicion is of a benign state that requires no course of action, is of a suspicious state that requires a biopsy, or is of an indeterminate state that requires subsequent imaging after a particular length of time. A determination that a region of suspicion is of an indeterminate state is made upon consideration of a calibration factor that biases the automatic determination towards either a benign state or a suspicious state.

The calibration factor may be based upon data collected from follow-up automatic detection examinations that reveal whether a lesion previously characterized as indeterminate was actually a benign or malignant lesion. Alternatively, the calibration factor may be based upon additional diagnostic information including prior image data or non-image data.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to provide a method for calibrating a CAD system in accordance with real clinical results obtained from the particular device, clinical institution and/or medical practitioner that uses the CAD system to reduce the levels of false positives and false negatives, for example, as described in detail below.

Exemplary embodiments of the present invention also seek to make use of particular non-image information such as patient medical history information to provide decision support to the CAD systems, for example, as described in detail below.

Exemplary embodiments of the present invention seek to image a patient's breast using DCE-MRI techniques and then perform CAD to identify regions of suspicion that are more likely to be malignant breast lesions. By utilizing DCE-MRI rather than mammography, additional data pertaining to contrast absorption and washout may be used to accurately distinguish between benign and malignant breast masses.

Figure 1:
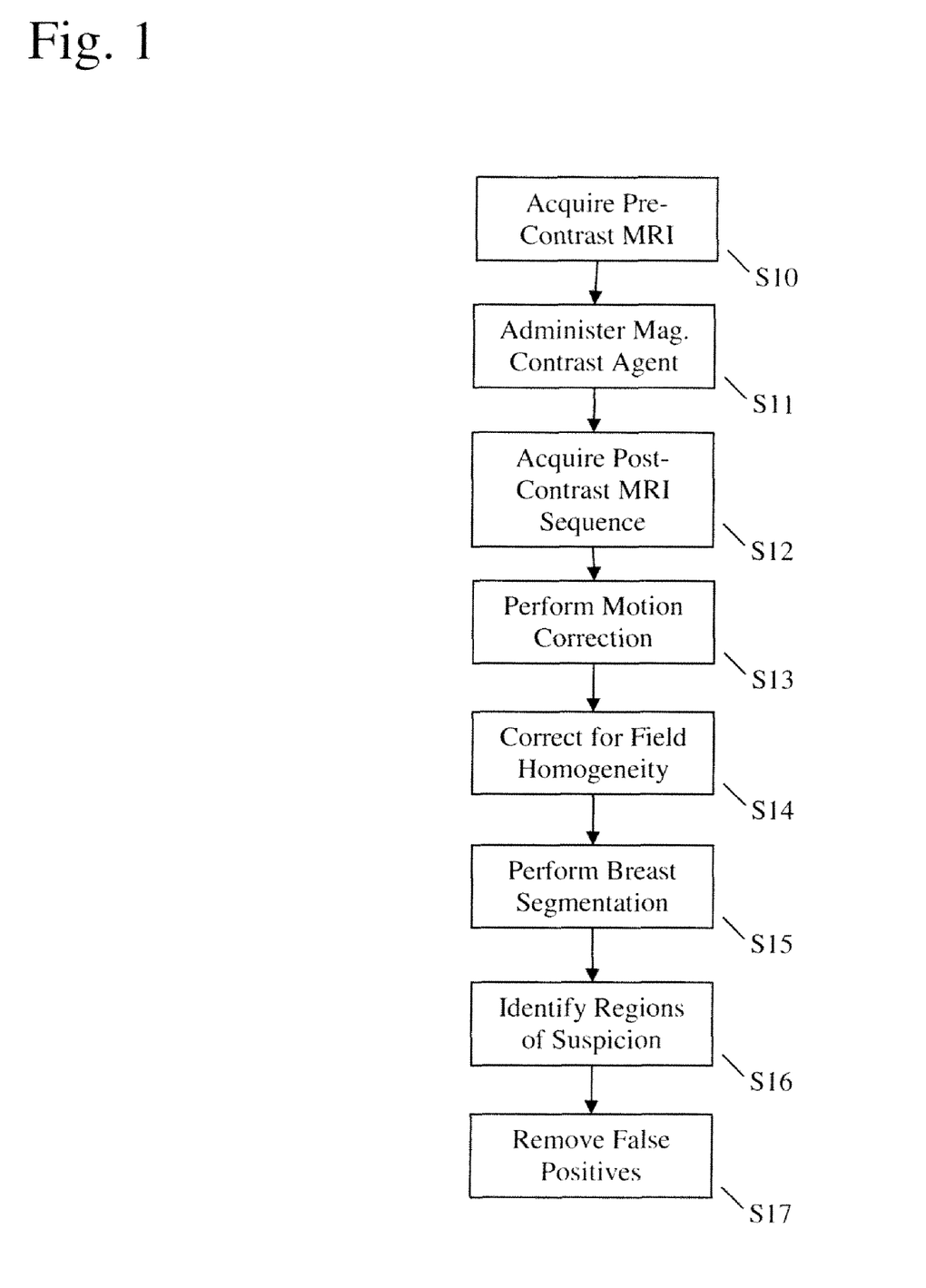
FIG. 1 is a flow chart illustrating a method for imaging a patient's breast using DCE-MRI and rendering a computer-aided diagnosis according to an exemplary embodiment of the present invention.

FIG. 1 is a flow chart illustrating a method for imaging a patient's breast using DCE-MRI and rendering a computer-aided diagnosis according to an exemplary embodiment of the present invention. First, a pre-contrast MRI is acquired (Step S10). The pre-contrast MRI may include an MR image taken of the patient before the magnetic contrast agent has been administered. The pre-contrast MRI may include one or more modalities. For example, both T1 and T2 relaxation modalities may be acquired.

Next, with the patient remaining as still as possible, the magnetic contrast agent may be administered (Step S11). The magnetic contrast agent may be a paramagnetic agent, for example, a gadolinium compound. The agent may be administered orally, intravenously, or by another means. The magnetic contrast agent may be selected for its ability to appear extremely bright when imaged in the T1 modality. By injecting the magnetic contrast agent into the patient's blood, vascular tissue may be highly visible in the MRI. Because malignant tumors tend to be highly vascularized, the use of the magnetic contrast agent may be highly effective for identifying regions suspected of being lesions.

Moreover, additional information may be gleamed by analyzing the way in which a region absorbs and washes out the magnetic contrast agent. For this reason, a sequence of post-contrast MR images may be acquired (Step S12). The sequence may be acquired at regular intervals in time, for example, a new image may be acquired every minute.

As discussed above, the patient may be instructed to remain as still as possible throughout the entire image acquisition sequence. Despite these instructions, the patient will most likely move somewhat from image to image. Accordingly, before regions of suspicion are identified (Step S16), motion correction may be performed on the images (Step S13).

At each acquisition, the image may be taken in the T1 modality that is well suited for monitoring the absorption and washout of the magnetic contrast agent.

Because MR images are acquired using a powerful magnetic field, subtle inhomogeneity in the magnetic field may have an impact on the image quality and may lead to the introduction of artifacts. Additionally, the level of enhancement in the post-contrast image sequence may be affected. Also, segmentation of the breast may be impeded by the inhomogeneity, as in segmentation, it is often assumed that a particular organ appears homogeneously. Accordingly, the effects of the inhomogeneous magnetic field may be corrected for within all of the acquired MR images (Step S14).

The order in which motion correction (Step S13) and inhomogeneity correction (Step S14) are performed on the MR images is not critical. All that is required is that these steps be performed after image acquisitions for each given image, and prior to segmentation (Step S15). These corrective steps may be performed for each image after each image is acquired or for all images after all images have been acquired.

After the corrective steps (Steps S13 and S14) have been performed, breast segmentation may be performed (Step S15). Segmentation is the process of determining the contour delineating a region of interest from the remainder of the image. In making this determination, edge information and shape information may be considered.

Edge information pertains to the image intensity changes between the interior and exterior of the contour. Shape information pertains to the probable shape of the contour given the nature of the region of interest being segmented. Some techniques for segmentation such as the classical watershed transformation rely entirely on edge information. Examples of this technique may be found in L. Vincent and P. Soille, "Watersheds in digital spaces: An efficient algorithm based immersion simulations" *IEEE Trans. PAMI,* 13(6):583-589, 1991, which is incorporated by reference. Other techniques for segmentation rely entirely on shape information. For example, in M. Kass, A. Witkin, and D. Terzopoulous, "Snakes—Active contour models" *Int J. Comp Vis,* 1(4): 321-331, 1987, which is incorporated by reference, a calculated internal energy of the curvature is regarded as a shape prior although its weight is hard-coded and not learned through training. In A. Tsai, A. Yezzi, W. Wells, C. Tempany, D. Tucker, A. Fan, and W. E. Grimson, "A shape-based approach to the segmentation of medical imagery using level sets" *IEEE Trans. Medical Imaging,* 22(2): 137-154, 2003, which is incorporated by reference, the shape prior of signed distance representations called eigenshapes is extracted by Principal Component Analysis (PCA). When the boundary of an object is unclear and/or noisy, the shape prior is used to obtain plausible delineation.

When searching for lesions in the breast using DCE-MRI, internal structures such as the pectoral muscles that are highly vascularized may light up with the application of the magnetic contrast agent. Thus, the pectoral muscles, and other such structures may make location of breast lesions more difficult. Accordingly, by performing accurate segmentation, vascularized structures that are not associated with the breast tissue may be removed from consideration thereby facilitating fast and accurate detection of breast lesions.

After segmentation has been performed (Step S15), the breast tissue may be isolated and regions of suspicion may be automatically identified within the breast tissue region (Step S16). A region of suspicion is a structure that has been determined to exhibit one or more properties that make it more likely to be a breast lesion than the regions of the breast tissue that are not determined to be regions of suspicion. Detection of the region of suspicion may be performed by systematically analyzing a neighborhood of voxels around each voxel of the image data to determine whether or not the voxel should be considered part of a region of suspicion. This determination may be made based on the acquired pre-contrast MR image as well as the post-contrast MR image. Such factors as size and shape may be considered.

Moreover, the absorption and washout profile of a given region may be used to determine whether the region is suspicious. This is because malignant tumors tend to show a rapid absorption followed by a rapid washout. This and other absorption and washout profiles can provide significant diagnostic information.

Breast imaging reporting and data systems (BIRADS) is a system that has been designed to classify regions of suspicion that have been manually detected using conventional breast lesion detection techniques such as mammography and breast ultrasound. Under this approach, there are six categories of suspicious regions. Category 0 indicates an incomplete assessment. If there is insufficient data to accurately characterize a region, the region may be assigned to category 0. A classification as category 0 generally implies that further imaging is necessary. Category 1 indicates normal healthy breast tissue. Category 2 indicates benign or negative. In this category, any detected masses such as cysts or fibroadenomas are determined to be benign. Category 3 indicates that a region is probably benign, but additional monitoring is recommended. Category 4 indicates a possible malignancy. In this category, there are suspicious lesions, masses or calcifications and a biopsy is recommended. Category 5 indicates that there are masses with an appearance of cancer and biopsy is necessary to complete the diagnosis Category 6 is a malignancy that has been confirmed through biopsy.

Exemplary embodiments of the present invention may be able to characterize a given region according to the above BIRADS classifications based on the DCE-MRI data. To perform this categorization, the absorption and washout profile, as gathered from the post-contrast MRI sequence, for each given region may be compared against a predetermined understanding of absorption and washout profiles.

Figure 2:
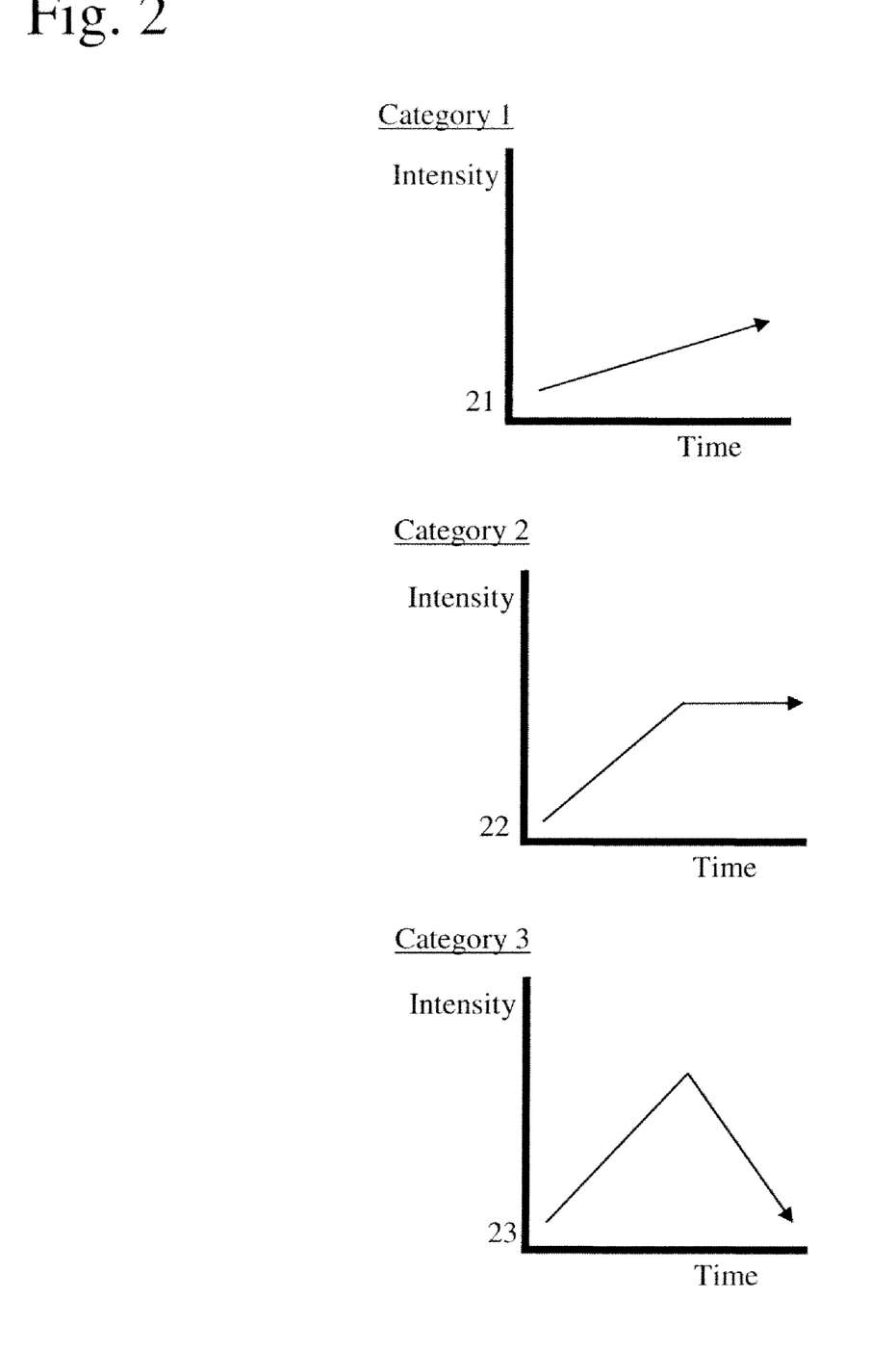
FIG. 2 is a set of graphs illustrating a correspondence between absorption and washout profiles for various BIRADS classifications according to an exemplary embodiment of the present invention.

FIG. 2 is a set of graphs illustrating a correspondence between absorption and washout profiles for various BIRADS classifications according to an exemplary embodiment of the present invention. In the first graph 21, the T1 intensity is shown to increase over time with little to no decrease during the observed period. This behavior may correspond to a gradual or moderate absorption with a slow washout. This may be characteristic of normal breast tissue and accordingly, regions exhibiting this profile may be classified as category 1.

In the next graph 22, the T1 intensity is shown to increase moderately and then substantially plateau. This behavior may correspond to a moderate to rapid absorption followed by a slow washout. This may characterize normal breast tissue or a benign mass and accordingly, regions exhibiting this profile may be classified as category 2.

In the next graph 23, the T1 intensity is shown to increase rapidly and then decrease rapidly. This behavior may correspond to a rapid absorption followed by a rapid washout. While this behavior may not establish a malignancy, it may raise enough suspicion to warrant a biopsy, accordingly, regions exhibiting this profile may be classified as category 3.

Other absorption and washout profiles may be similarly established for other BIRAD categories. In this way, DCE-MRI data may be used to characterize a given region according to the BIRADS classifications. This and potentially other criteria, such as size and shape, may thus be used to identify regions of suspicion (Step S16).

After regions of suspicion have been identified, false positives may be removed (Step S17). As described above, artifacts such as motion compensation artifacts, artifacts cause by magnetic field inhomogeneity, and other artifacts, may lead to the inclusion of one or more false positives. Exemplary embodiments of the present invention and/or conventional approaches may be used to reduce the number of regions of suspicion that have been identified due to an artifact, and thus false positives may be removed. Removal of false positives may be performed by systematically reviewing each region of suspicion multiple times, each time for the purposes of removing a particular type of false positive. Each particular type of false positive may be removed using an approach specifically tailored to the characteristics of that form of false positive. Examples of such approaches are discussed in detail below.

After false positives have been removed (Step S17), the remaining regions of suspicion may be presented to the medical practitioner for further review and consideration. For example, the remaining regions of interest may be highlighted within a representation of the medical image data. Quantitative data such as size and shape measurements and or BIRADS classifications may be presented to the medical practitioner along with the highlighted image data. The presented data may then be used to determine a further course of testing or treatment. For example, the medical practitioner may use the presented data to order a biopsy or refer the patient to an oncologist for treatment.

As discussed above, exemplary embodiments of the present invention seek to provide a method for calibrating a CAD system in accordance with real clinical results obtained from the particular device, clinical institution and/or medical practitioner that uses the CAD system to reduce the levels of false positives and false negatives. This may be especially useful when applied to a conventional mammography apparatus and or a DCE-MRI apparatus where regions of suspicion are characterized according to BIRADS classifications.

In particular, when a region of suspicion is characterized as either a category 3 region, additional monitoring is generally required. For example, the patient may be instructed to be retested in six months. This category may be particularly problematic because regardless of the outcome, an error has occurred. For example, if a patient is judged to have a category 3 lesion, in six months time that patient will either be found to have no malignancy in which case the patient has been made to endure anguish that could have been avoided, or the patient is found to have a malignancy in which case the malignancy was permitted to go without treatment for six months. In either case, it would have been preferable that the lesion be assigned a different category number.

Of course, there may always be a region of suspicion that is simply too close to call, however, exemplary embodiments of the present invention seek to minimize category 3 classifications by either precisely calibrating a CAD system for a particular institution or user or by making use of pertinent non-image information such as patient history and the like.

Figure 3:
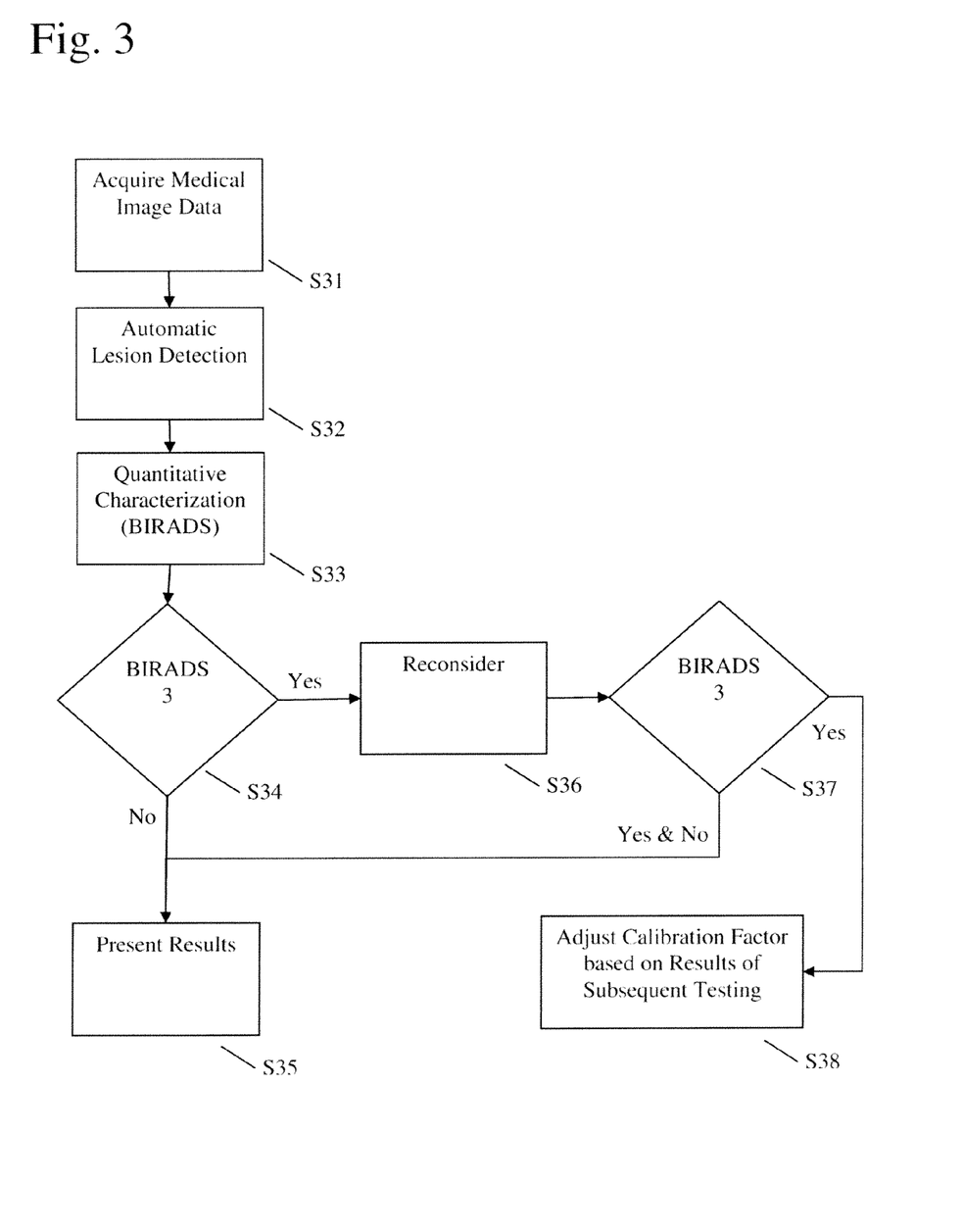
FIG. 3 is a flow chart illustrating a method for automatically calibrating a computer aided design system based on retrospective examination according to an exemplary embodiment of the present invention.

FIG. 3 is a flow chart illustrating a method for automatically calibrating a computer aided design system based on retrospective examination according to an exemplary embodiment of the present invention. Such methods may make allowances for the particular factors of use that may be associated with either the particular user/operator or the clinical institution where the device is used. Conventional CAD systems may be trained once and then may be placed into clinical use. Once in clinical use, the conventional CAD system is no longer trained and computer assisted diagnosis may not be able to make allowances for the particular factors of the user and/or institution. Accordingly, certain users and or institutions may see a greater number of category 3 lesions turn out to be benign and other users and or institutions may see a greater number of category 3 lesions turn out to be malignant.

Accordingly, first medical image data may be acquired (Step S31). The first medical image data may be mammography data or the first medical image data may be MR image data, for example, of a DCE-MRI. Automatic lesion detection may then be performed on the first medical image data (Step S32). Automatic lesion detection may be performed, for example, as described in detail above with respect to FIG. 1 and may include all steps from S10 through to S17.

In the process of performing automatic lesion detection on the first medical image data, each region of interest that has not been removed as a false positive may be characterized according to BIRADS categories or a similar quantitative metric (Step S33). If the results of the classification indicate that a detected region of suspicion has been classified as a BIRADS category 3 (Yes, Step S34), then a reconsideration step may be performed (Step S36). During the reconsideration step, the factors that initially lead to the finding of the category 3 classification are reconsidered in light of a calibration factor. If the calibration factor is high then an upwards bias is applied to the classification such that there is a stronger chance that the region of suspicion is reclassified as a category 4 rather than a category 3. If the calibration factor is low then a downwards bias is applied to the classification such that there is a stronger chance that the region of suspicion is reclassified as a category 2 rather than a category 3.

The reclassification is not an absolute bump of the BIRADS category, the factors that initially lead to the finding of category 3 are still considered and thus there is a chance that the classification of category 3 is confirmed during reconsideration as there is a chance that the category is changed to either 2 or 4. Moreover, the calibration factor may be quantitative such that the higher the calibration factor the greater the bias towards category 4 and the lower the calibration factor, the greater the bias towards category 2.

The reconsideration step need not be an actual reconsideration. Instead, the above-described bias in accordance with the calibration factor may be applied to the initial characterization of the region of suspicion. All that is required is that before a characterization of category 3 is assigned, the result be biased on accordance with the calibration factor.

The results of the reconsideration step (Step S36) may then be presented to the medical practitioner to render a diagnosis and course of treatment. It may then be determined whether the classification is still BIRADS 3 (Step S37). If the result is a category 2 (No, Step S37) then the medical practitioner may determine that there is no risk of cancer. If the result is a category 4 (also No, Step S37) then the practitioner may determine that a biopsy is necessary. If the result remains a category 3 (Yes, Step S37) then the medical practitioner may determine that a further test is needed, for example in six months time and the results of this further test may be collected and used to adjust the calibration factor for subsequent use of the CAD system (Step S38).

For example, if the results of the further test show that the region of suspicion is malignant then the calibration factor may be increased. If the results of the future test show that the region of suspicion is benign then the calibration factor may be lowered. In this way, the retrospective examination of BIRADS 3 findings may be used to refine the classification process that leads to a determination of BIRADS 3 and thus the number of BIRADS 3 findings may be reduced over time to account for the particular user and/or institution that uses the system.

Along with the results of the reconsideration step (Step S36), the calibration factor used and/or a statistical summary of the data used to influence the calibration factor may be displayed to the medical practitioner so that the medical practitioner may be advised of the rational that may have contributed to any possible upgrade or downgrade. Accordingly, the medical practitioner could be made aware of any upgrade or downgrade that has occurred and the justification for the change so that the medical practitioner would be free to examine all pertinent data in rendering a final diagnosis based on the CAD results. Thus the medical practitioner would remain free to overrule the upgrade or downgrade where desired.

Moreover, the statistical summary may be based on data that pertains to CAD results for the particular medical practitioner overseeing the use of the CAD system and the final diagnosis. The system may, for example, display two statistics: the first statistic pertaining to an entire set of past data for the CAD machine regardless of practitioners, and the other pertaining to past data for the particular medical practitioner overseeing the use of the CAD system and the final diagnosis.

Accordingly, the medical practitioner may then recognize if he is more prone to overcall or undercall based on his past readings, and may be made aware of the factors that may contribute to an upgrade or downgrade.

The raising and lowering of the calibration factor may be based on multiple applications of the above-described method. For example, it may take a particular number of occurrences of category 3 regions being later determined to be malignant before the calibration factor is raised and/or it may take a particular number of occurrences of category 3 regions being later determined to be benign before the calibration factor is lowered.

If the detected region of suspicion has not been classified as a BIRADS category 3 (No, Step S34), then the determined BIRADS classification may be presented to the medical practitioner so that a diagnosis and course of treatment may be determined (Step S35). Similarly, after the detected region of suspicion has been reconsidered (Step S36) and reexamined to determine whether the region of suspicion has been classified as a BIRADS category 3 (Yes or No, Step S37) then the determined BIRADS classification may be presented to the medical practitioner so that a diagnosis and course of treatment may be determined (Step S35). Accordingly, in all cases, the results are presented to the medical practitioner (Step S35), but it is only when the detected region of suspicion remains a category 3 (Yes Step S37) that the results of a follow-up test are used to adjust the calibration factor (Step S38).

As discussed above, it is not necessary that the BIRADS scale be used to assess the region of suspicion, all that is necessary is that a determination is made as to whether the region of suspicion should be biopsied, should be tested again in a follow-up test, or whether no action should be taken. Then, when a follow-up test is desired, the eventual results of the follow-up test are fed back to the automatic decision making process to help determine whether bias subsequent determinations in favor of biopsy or taking of no action. Because the nuances of a particular institution or user may tend to lead to either an inclination to perform follow-up tests when either a biopsy or no action is optimal, exemplary embodiments of the present invention are able to adjust for these particular nuances and decrease the number of times that a follow-up test is required.

Because of the above-described disadvantages associated with the classification of a region of suspicion as a BIRADS category 3 region, or more generally, with a finding that a follow-up test is required, exemplary embodiments of the present invention may utilize additional diagnostic data when such a determination is made, and this additional diagnostic data may be used to bias the finding towards either a category 2 or a category 4, or more generally, towards a decision that either no action need be taken or a biopsy should be performed.

This additional diagnostic data may be non-image data such as patient past history data, patient family history data, blood test results, genetic test results, and the like. Examples of approaches for the use of additional diagnostic data include pedigree assessment tools (PAT), modified Gail models, and Clause models.

Because of the computational difficulty associated with non-image data, and the desire to keep separate computer aided diagnosis based on image data and other diagnostic information such as non-image data, it may be beneficial to refrain from making use of the non-image data unless and until at least a preliminary finding of category 3, or equivalent, is made.

Moreover, the additional diagnostic information may be medical image data such as prior medical image data that may be used to help establish a pattern of change over time, or lack thereof, that may be helpful in determining whether to bias the decision making process towards category 2 or category 4, when it is preliminarily determined that category 3 may be appropriate.

Figure 4:
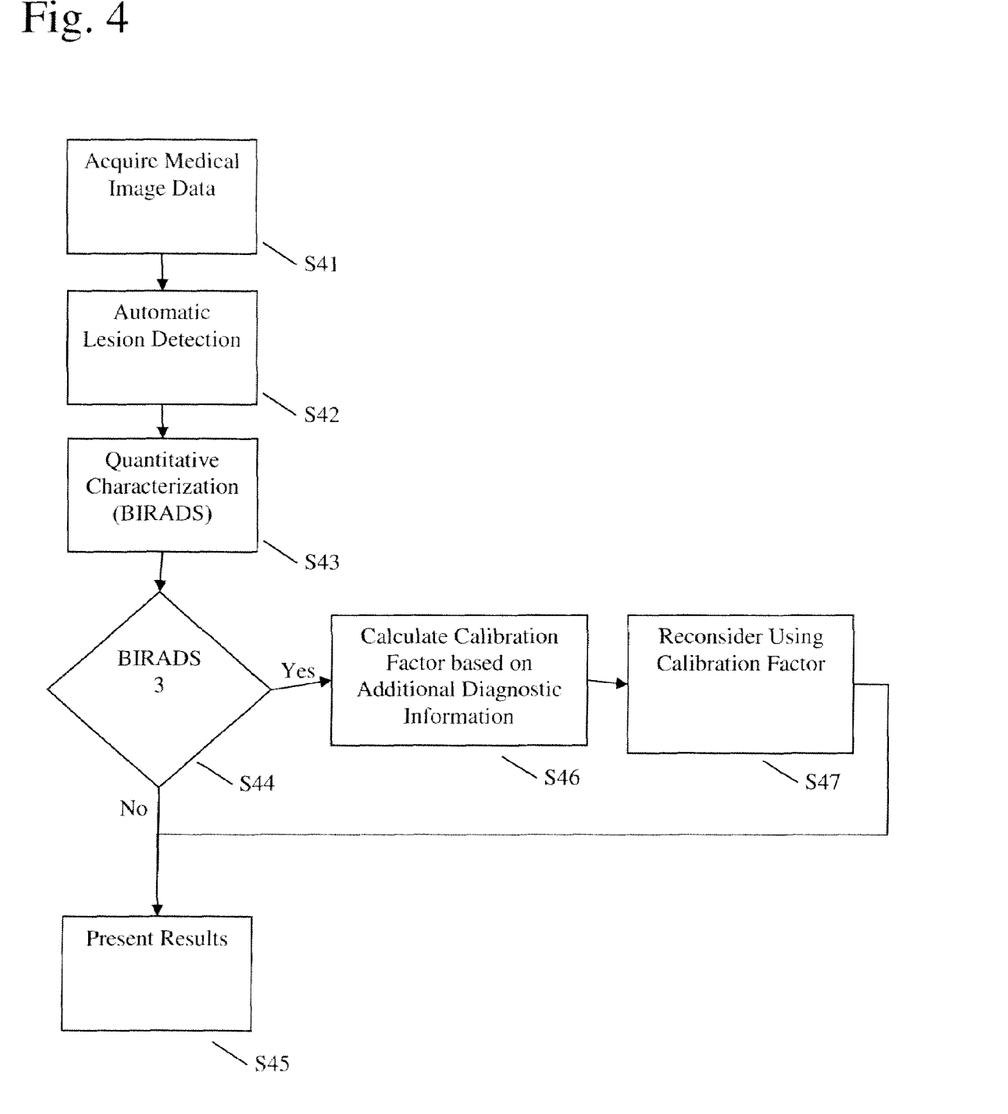
FIG. 4 is a flow chart illustrating a method for performing computer aided diagnosis of medical image data using additional diagnostic information according to an exemplary embodiment of the present invention.

FIG. 4 is a flow chart illustrating a method for performing computer aided diagnosis of medical image data using additional diagnostic information according to an exemplary embodiment of the present invention. Many of the steps may be similar to steps described in detail above with respect to FIG. 3.

First, medical image data may be acquired (Step S41), automatic lesion detection may be performed (Step S42) and the detected regions of interest may be categorized in accordance with the BIRADS scale or a similar metric (Step S43). These steps may be similar to steps S31, S32, and S33 described in detail above.

Then it may be determined whether the result of the categorization is a BIRADS level 3, or more generally, a finding that a follow-up test is desired (Step S44). If the result of the categorization is not a BIRADS level 3 and/or no follow-up testing is desired (No, Step S44), then the results may be presented to the medical practitioner to aid in effective patient care such as the performance of a biopsy or a finding that no further action is required (Step S45). If, however, the result of the categorization is a BIRADS level 3 and/or biopsy or no action is desired (Yes, Step S44), then a calibration factor may be calculated based on additional diagnostic information, including non-image information and/or additional image information (Step S46). The calibration factor may then be used to reconsider the classification (Step S47) in a step similar to Step S36 described above with respect to FIG. 3. Accordingly, the additional diagnostic information may be brought into consideration when finding of BIRDS 3 has been made for the purposes of biasing a reconsideration towards either a biopsy or a determination that no additional action is required, and in so doing, reducing the number of determinations that a follow-up test is required within a particular number of months, such as 6-months.

As many patients over a certain age may be advised to undergo a mammography or comparable diagnostic on a periodic basis, such as once every year, it should be understood that a follow-up test, if required, may be a test that is performed at a reduced length of time, for example, in six months. Alternatively, the follow-up test may be performed as part of the next regularly scheduled mammography or comparable diagnostic.

Figure 5:
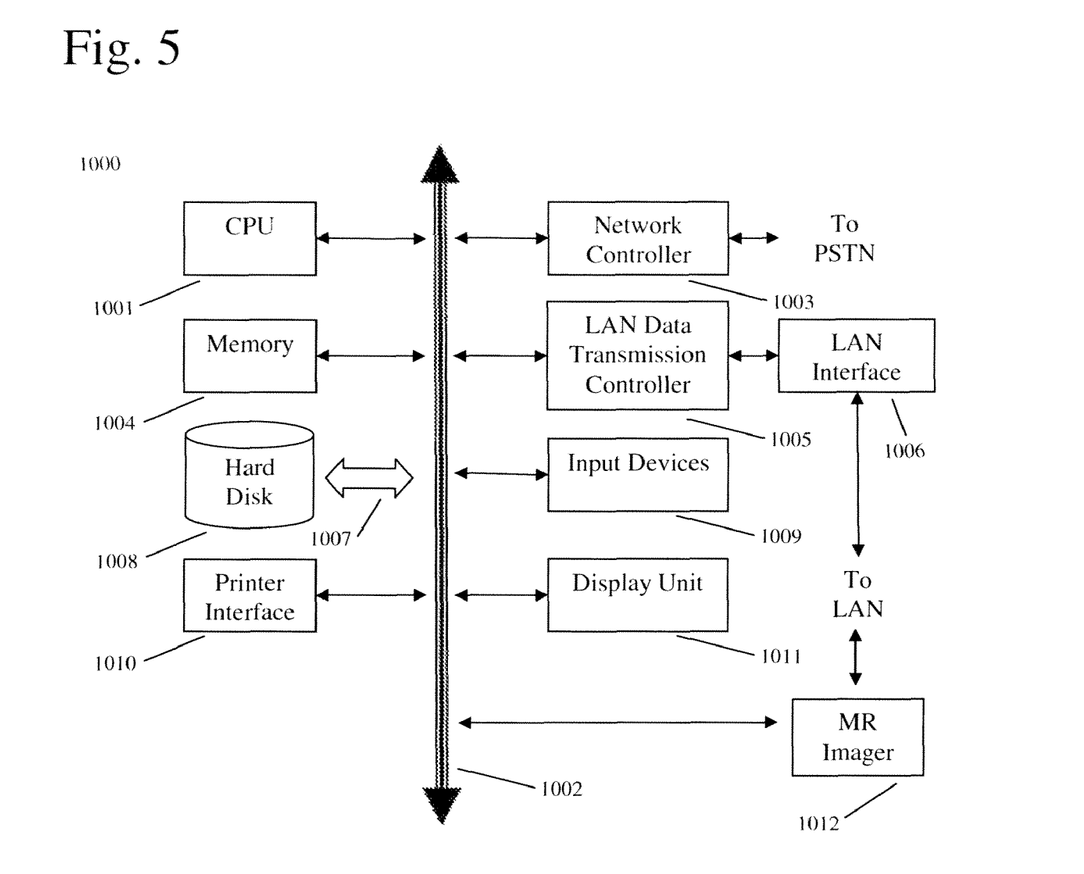
FIG. 5 shows an example of a computer system capable of implementing the method and apparatus according to embodiments of the present disclosure.

FIG. 5 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007. A MR imager 1012 may be connected to the internal bus 1002 via an external bus (not shown) or over a local area network.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for automatic computer-aided detection of lesions within a digital or digitized medical image, comprising:

acquiring a digital or digitized medical image of a patient comprising initial medical image data;

automatically segmenting the medical image data and automatically identifying one or more regions of suspicion within the medical image data; and automatically analyzing each identified region of suspicion to determine whether each identified region of suspicion is of a benign state that requires no course of action, is of a suspicious state that requires a biopsy, or is of an indeterminate state that requires subsequent imaging after a particular length of time, wherein upon a determination that a region of suspicion is of an indeterminate state:

acquiring a second digital or digitized medical image of the patient comprising secondary medical image data;

determining a calibration factor;

automatically re-analyzing each identified region of suspicion initially determined to be of an indeterminate state, wherein the re-analyzing determination is made upon consideration of the calibration factor that biases the automatic determination towards either a benign state or a suspicious state; and adjusting the calibration factor based on results of the re-analyzing determination so as to minimize subsequent findings of the indeterminate state.

2. The method of claim 1, wherein the calibration factor is based upon additional diagnostic information.

3. The method of claim 2, wherein the additional diagnostic information includes prior image data.

4. The method of claim 2, wherein the additional diagnostic information includes non-image data.

5. The method of claim 1, wherein in automatically determining the state of each identified region of suspicion, each region of suspicion is characterized in accordance with BIRADS and the benign state is BIRADS 1 or 2, the indeterminate state is BIRADS 3, and the suspicious state is BIRADS 4 or above.

6. The method of claim 1, wherein the higher the calibration factor, the greater the bias for a region of suspicion to be characterized as a suspicious state and the lower the calibration factor, the greater the bias for a region of suspicion to be characterized as a benign state.

7. The method of claim 1, wherein the medical image data is dynamic contrast enhanced MR image data including a patient's breast.

8. The method of claim 7, wherein the automatic identification of the regions of suspicion includes identifying the regions of suspicion based on an absorption and washout profile observed from the dynamic contrast enhanced MRI.

9. The method of claim 1, wherein the medical image data is mammography image data.

10. The method of claim 1 wherein adjusting the calibration factor comprises changing the calibration factor when a predetermined number of occurrences of indeterminate states are re-determined to be malignant or benign.

11. A method for automatic computer-aided detection of lesions within a digital or digitized medical image, comprising:

acquiring a digital or digitized medical image of a patient comprising initial medical image data;

automatically segmenting the medical image data and automatically identifying one or more regions of suspicion within the medical image data;

automatically analyzing each identified region of suspicion to determine whether each identified region of suspicion is of a benign state that requires no course of action, is of a suspicious state that requires a biopsy, or is of an indeterminate state that requires subsequent imaging after a particular length of time; and when an identified region of suspicion is determined to be of an indeterminate state, acquiring a second digital or digitized medical image of the patient comprising secondary medical image data, determining a calibration factor, and automatically reconsidering each identified region of suspicion initially determined to be of an indeterminate state, wherein automatically reconsidering the determination is in light of the calibration factor that biases the automatic determination towards either a benign state or a suspicious state so as to minimize findings of the indeterminate state.

12. The method of claim 11, wherein the calibration factor is based upon additional diagnostic information.

13. The method of claim 12, wherein the additional diagnostic information includes prior image data.

14. The method of claim 12, wherein the additional diagnostic information includes non-image data.

15. The method of claim 11, wherein in automatically determining the state of each identified region of suspicion, each region of suspicion is characterized in accordance with BIRADS and the benign state is BIRADS 1 or 2, the indeterminate state is BIRADS 3, and the suspicious state is BIRADS 4 or above.

16. A computer system comprising:
a processor; and
a program storage device readable by the computer system, embodying a program of instructions executable by the processor to perform method steps for automatically detecting breast lesions, the method comprising:

acquiring a first medical image of a patient comprising initial medical image data including a patient's breast;

automatically segmenting the initial medical image data and automatically identifying one or more regions of suspicion within the medical image data; and automatically determining whether each identified region of suspicion is of a benign state that requires no course of action, is of a suspicious state that requires a biopsy, or is of an indeterminate state that requires subsequent imaging after a particular length of time, wherein upon a determination that a region of suspicion is of an indeterminate state: acquiring a second medical image of the patient comprising secondary medical image data, determining a calibration factor, and automatically reconsidering each region of suspicion initially determined to be of an indeterminate value, wherein the reconsideration is made upon consideration of the calibration factor that biases the automatic determination towards either a benign state or a suspicious state so as to minimize findings of the indeterminate state.

17. The computer system of claim 16, wherein the calibration factor is based upon additional diagnostic information including prior image data or non-image data.

18. The computer system of claim 16, wherein the automatically determined state for each identified region of suspicion is presented to a user along with a summary of statistical data that the calibration factor is based upon.

* * * * *